United States Patent [19]

Rypinski

[11] Patent Number: 5,440,560
[45] Date of Patent: Aug. 8, 1995

[54] SLEEP MODE AND CONTENTION RESOLUTION WITHIN A COMMON CHANNEL MEDIUM ACCESS METHOD

[76] Inventor: Chandos A. Rypinski, 130 Stewart Dr., Tiburon, Calif. 94920

[21] Appl. No.: 854,493

[22] Filed: Mar. 20, 1992

Related U.S. Application Data

[63] Continuation-in-part of Ser. No. 813,956, Dec. 24, 1991.

[51] Int. Cl.[6] .............................................. H04J 3/16
[52] U.S. Cl. .................................. 370/95.2; 370/85.8; 340/825.08; 455/38.3; 455/343
[58] Field of Search ................. 370/85.2, 95.3, 95.1, 370/104.1, 85.7, 94.1, 85.8; 455/53.1, 54.1, 343, 38.3, 222, 33.1, 33.2; 340/825.5, 825.08, 825.09

[56] References Cited

U.S. PATENT DOCUMENTS

| | | | |
|---|---|---|---|
| 4,577,315 | 3/1986 | Otsuku | 455/38.3 |
| 4,679,244 | 7/1987 | Kawasaki et al. | 455/343 |
| 4,736,461 | 4/1988 | Kawasaki et al. | 455/343 |
| 5,061,922 | 10/1991 | Nishijima et al. | 370/95.2 |
| 5,241,542 | 8/1993 | Natarajan et al. | 370/85.2 |

*Primary Examiner*—Douglas W. Olms
*Assistant Examiner*—Ajit Patel
*Attorney, Agent, or Firm*—Larry D. Johnson

[57] ABSTRACT

A method of sleep mode and contention resolution provides management of a sleep mode in stations and backup for resolution of contention on request for service messages. This reduces the possibility of excessively delayed access to infrastructure services by providing a backup non-contending POLL for service REQUESTs which are invoked at the Access-point Hub Controller upon indication of possible contention. A fast POLL of Stations registered to that Access-point is made in the following available time with a possibility of carry-over to the next access opportunity. The length of the POLL is minimized by addressing only "awake" Stations and omitting those in sleep mode. A slow POLL is used to transfer Stations in and out of sleep mode, and for other purposes.

10 Claims, 4 Drawing Sheets

SLEEP MODE AND CONTENTION RESOLUTION WITHIN A COMMON CHANNEL MEDIUM ACCESS METHOD

This application is a continuation-in-part of copending application Ser. No. 07/813,956, filed Dec. 24, 1991, for an ACCESS PROTOCOL FOR A COMMON CHANNEL WIRELESS NETWORK. This application is related to copending application Ser. No. 07/852,323, filed Mar. 18, 1992, for a HUB CONTROLLER ARCHITECTURE AND FUNCTION FOR A MULTIPLE ACCESS-POINT WIRELESS COMMUNICATION NETWORK.

BACKGROUND OF THE INVENTION

FIELD OF THE INVENTION

This invention concerns portable computers which use wireless transmission for high rate digital communication between each other and with external networks. The invention is further concerned with a "sleep mode" in the Station to avoid battery drain from inactive functions and of a refinement of the access method to deal with simultaneous requests for service from Stations when a communication infrastructure is present. This art is increasingly important as the wireless device becomes smaller, lighter and contains less electrical storage capacity.

DESCRIPTION OF PRIOR ART

The known prior art is in each of the contributing areas taken one-at-a-time and without radio context, except that the contention type medium access is well studied for radio.

Sleep Mode

There is prior art for several forms of sleep mode in portable computers. If the computer is ON and no key has been depressed for a specified time interval, the screen goes blank until a key is again pressed. Some machines only power memory and processing functions for the interval in which they are actually used following a key stroke or other activating event. It is common for hard disk drive memory to rotate only on demand and for a short interval after the last access. This function could also be called "activation on demand."

An awake or active state may begin when the CPU is powered on and timeout after it goes OFF. It is expected that this type of function will be further refined along with the rest of the portable computing function.

Polling

There is prior art for polling systems in which the poll is used as an orderly access method so that each Station has its own non-contending opportunity to request service. This mode is commonplace in wired computer networks. Token-passing from Station to Station is a prior art way of achieving the same function as polling but with the logic function entirely distributed. No prior art polling is known that involves a power conserving sleep mode. Prior art Polling is not known which is adaptively employed in a wireless system as a fallback means of contention resolution.

Contention Resolution

Using a radio transmission medium there are many prior art contention resolution systems in which a Station desiring to transmit listens for a channel idle condition before transmitting. It is difficult to detect contention in a simplex radio system because the sending Station cannot hear other Stations while it is sending.

Prior art solutions depend mostly on some form of "try again" logic at the originating Station. To avoid two Stations trying again at the same time, "backoff" algorithms are provided where further attempts are delayed by a different random value at each contending Station. This procedure applies to Stations that know they have failed to get the expected response, but not to an infrastructure that hears a garbled transmission. These contention systems usually delineate the instant at which the channel may be used by information gained from monitoring the transmission channel. A channel silent condition is often considered as the enabling condition.

Time-Slotted Systems

It has often been found convenient to divide time into slots each of which can be used independently. Many of these prior art systems achieve the advantage of separating the time interval where a service request is made and that used to transmit information. When there is contention, only the request fails. Data is always transferred in reserved space.

Prior art slotted systems are more commonly used with infrastructure that does not include a direct Station-to-Station mode, and they are more commonly used when all or part of the service is connection-type as in digital telephony. The slotted system delineates the instant at which a request for service may be made by a defined time slot in the frame.

Radio Signal Level as an Access Test

Prior art systems that depend on absence of received radio signal are subject to a difficulty known as "busy lockout" where the channel appears non-idle from signals at a great distance or spurious signals created by non-linear effects in equipment. Some prior art systems desensitize the signal-detect function running the risk of interfering with some signals that are then not detected. Other prior art systems make an improvement by avoiding the use of a signal level measuring circuit and using instead a valid data or valid clock indication which is only generated by other Stations within the same system and which is not level dependent. Dependence on signal level is more likely report signal present when it should be ignored than it is to report signal absent when it is actually there.

Contention Models in Radio System

Most known analysis of radio systems assumes that the range of a radio Station for service and for interference is alike. A Station may cause interference at a far greater range than that over which it may give reliable service. For the case of an indefinitely large system, there will be times when signals are continuously observable. This factor is rarely considered in radio system analysis by those not experienced in this art. If analog signal level is used, it must be assumed that it will be wrong or misleading for a large proportion of the instances when it is used.

SUMMARY OF THE INVENTION

The sleep mode and contention resolution within a common channel medium access method of this invention depends upon the access-method and the air interface for the "ACCESS PROTOCOL FOR A COMMON CHANNEL WIRELESS NETWORK" described in copending application Ser. No. 07/813,956. Communication is accomplished with limited length data bursts identified for processing at the receiving point by information in a header.

This invention also uses an infrastructure type architecture with a Hub Controller common to many Access-points; and it is an extension of the POLL and Station-originate message functions described in the copending patent application which provides:

1) management of a sleep mode in Stations; and
2) backup means of resolution of contention on REQUEST for service messages.

The scope of this invention is not limited to this particular access method, but it is directed to those mediums and access protocols where:

1) a request for service takes place following an enabling event or instant of time;
2) more than one Station may initiate such a request following the enabling event or instant of time;
3) that contention event is not clearly identifiable because of a failure to decode the message of either contending Station; and
4) the Stations do not have an assured way of recovering from this situation in an acceptably short time interval.

The above reference to an instant of time refers to the beginning of a time slot of defined length and purpose within a frame period of more than one time slot.

PREFERRED FORM OF PHYSICAL IMPLEMENTATION

The implementation is in the following parts:

1) the algorithms executed in the hub control function;
2) the Station protocol added to resolve contention;
3) the architecture of the Station needed to make use of sleep mode; and
4) increased use of the signal level reporting function in the Access-point receiver as an input to hub control function.

SUMMARY OF OPERATION

The invention reduces the possibility of excessively delayed access to infrastructure services by providing a backup non-contending POLL (hereafter referred to as ADDRESSED INVITATION-TO-REQUEST or fast POLL) for service REQUESTs which are invoked at the Access-point Hub Controller upon indication of possible contention. This indication is derived from the output of the Access-point receiver and interpreted at the Hub Controller from the combination of signal present and absence of successful REQUEST decode. The signal present indication is refined to mean an increase of signal level between a background level existing just before the REQUEST response starts and a current level just after the REQUEST response starts.

A fast POLL of Stations registered to that Access-point is made in the following available time with a possibility of carry-over to the next access opportunity. The length of the POLL is minimized by addressing only "awake" Stations and omitting those in sleep mode.

A slow POLL is used to transfer Stations in and out of sleep mode, and for other purposes. The Access-point frame for the slow POLL includes a field to instruct the Station to stay awake or to sleep for a specified interval. The Station response to a slow POLL may either:

1) acknowledge an immediate wakeup, or
2) inform the Hub Controller that it is immediately becoming awake, or
3) accept the proposed wakeup time, or
4) propose a change to the wakeup time.

The Station may also inform the Hub Controller of a need to wakeup by requesting service at any time following an OPEN INVITATION.

DETAILED DESCRIPTION OF A PREFERRED EMBODIMENT

A preferred integrated implementation of the POLLing controlled sleep mode and the backup POLLing method of contention resolution are described below first defining the new or modified messages required and then the operation in greater detail.

NEW DEFINITIONS FOR THE MESSAGE-BASED ACCESS PROTOCOL

The messages involved in these new functions (relative to those in the referenced copending patent application) are as follows:

| Access-point originate | Station originate |
|---|---|
| POLL | Acknowledge |
| INVITATION-TO-REQUEST | |

The INVITATION-TO-REGISTER and the POLL are the same message differing only by a null value in the destination address field for the POLL. The POLL message must now carry a next-wakeup-time parameter WUT which is substituted for the 8-bit SYS field. The SYS/WUT octet may not be interpreted until after the DA field is interpreted as NULL/DA. This minor circuit inconvenience is maintained for consistency in the field order of messages. A null value in the WUT field is the immediate wakeup command. The Station-originated response REGISTER message is unaffected.

The response to the POLL message has been and will continue to be ACKnowledge for the case where there is no disagreement with the content of the POLL message. The 4-bit CNN field is either NULL for no change or it is has a value indicating an increment or decrement in the WUT value. It is unlikely that a capability for the Station to change the WUT value will be needed.

INVITATION-TO-REQUEST now has added the DA field making it identical in format to the INVITATION-TO-REGISTER. In this case, the NULL value in the DA field indicates an open response. With a value in the DA field, it becomes an ADDRESSED INVITATION-TO-REQUEST.

The Station-originated response to either INVITATION-TO-REGISTER or TO-REQUEST is an unchanged REGISTER or REQUEST. A revised and current list of fields incorporating these and other minor changes, is shown below in Table I.

TABLE I

FIELDS AND ACRONYM DEFINITION

| ACRONYM | DEFINITION | LENGTH IN BITS |
|---|---|---|
| API = | Access-point identifier | 4 |
| CNN = | connection number identifier within Station | 4 |
| CKS = | checksum for header | 8 |
| CRC = | cyclic redundancy check--802 defined | 32 |
| DA = | destination address | 16 |
| SDU = | transported service data unit | 0-512 octets |
| DIR = | direction bit--last bit of SD, and 1st digit of message type identifier | 1 |
| ED = | end delimiter using 7-bit Barker, transition bit | 8 |
| LEN = | length of PDU in octets (see note) | 12 |
| NUL = | null--no assigned meaning | |
| PRE = | preamble | 16 |
| PWR = | power set command | 4 |
| SA = | source address | either 16 or 64 |
| SD = | start delimiter--7-bit Barker and DIR field | 7+1 |
| SGN = | segment counter/circuit status | 8 |
| SID = | service type identifier and priority | 4 |
| SYS = | system identifier | 8 |
| TYP = | 2nd and 3rd digits of message type identifier | 4 |
| WUT = | Wakeup timer interval | 8 |

A revised list of messages identifying the fields and functions in each is shown below in Table II.

TABLE II

MESSAGE FORMAT AND FIELDS
With message length in octets

ACCESS-POINT ORIGINATE

| | | |
|---|---|---|
| 001 | SEGMENT DATA FRAME--SHORT ADDRESS<br>PRE (15), SD (7), DIR (1)<br>TYP (4), CNN (4), SGN (8)<br>DA (16), CKS (8)<br>SDU 0-512 octs<br>CRC (16), ED (7) | 11+SDU |
| 003 | PACKET DATA FRAME--LONG ADDRESS<br>PRE (15), SD (7), DIR (1)<br>TYP (4), API (4), SYS (8)<br>DA (64), SA (64)<br>SID (4), LEN (12), CKS (8)<br>SDU 0-512 octs<br>CRC (16), ED (7) | 27+SDU |
| 005 | INVITATION-TO-REQUEST<br>PRE (15), SD (7), DIR (1)<br>TYP (4), API (4), SYS (8)<br>DA (16)<br>CKS (8), ED (7) | 9 |
| 007 | POLL or INVITATION-TO-REGISTER<br>PRE (15), SD (7), DIR (1)<br>TYP (4), API (4), SYS (8)<br>DA (16)<br>CKS (8), ED (7) | 9 |
| 009 | ACK<br>PRE (15), SD (7), DIR (1)<br>TYP (4), API (4), SYS (8)<br>DA (16)<br>CKS (8), ED (7) | 9 |
| 011 | NACK-REPEAT<br>PRE(15), SD (7), DIR (1)<br>TYP (4), API (4), SYS (8)<br>DA (16)<br>CKS (8), ED(7) | 9 |
| 013 | GRANT (DA=requesting Station)<br>PRE (15), SD (7), DIR (1)<br>TYP (4), API (4), SYS (8)<br>DA (16)<br>SGN (8), CNN (4), PWR (4)<br>CKS (8), ED (7) | 11 |
| 015 | Not used<br>used in autonomous mode only | |
| 109 | Same as 009 | |
| 111 | Same as 011 | |

TABLE II-continued
MESSAGE FORMAT AND FIELDS
With message length in octets

| | | |
|---|---|---|
| 113 | Same as 003 | |
| 115 | Same as 005 | |
| | STATION ORIGINATE | |
| 100 | SEGMENT DATA FRAME--SHORT ADDRESS<br>PRE (15), SD (7), DIR (1)<br>TYP (4), CNN (4), SGN (8)<br>DA (16), CKS (8)<br>SDU 0-512 octs<br>CRC (16), ED (7) | 11+SDU |
| 102 | PACKET DATA FRAME<br>PRE (15), SD (7), DIR (1)<br>TYP (4), CNN (4), SGN (8)<br>DA (16), CKS (8)<br>SDU 0-512 octs<br>CRC (16), ED (7) | 11+SDU |
| 104 | REGISTER<br>PRE (15), SD (7), DIR (1)<br>TYP(4), API(4)<br>SA (64)<br>CKS (8), ED(7) | 14 |
| 106 | DE-REGISTER<br>PRE (15), SD (7), DIR (1)<br>TYP (4), API(4)<br>SA (64)<br>CKS (8), ED (7) | 14 |
| 108 | REQUEST--SHORT ADDRESS<br>PRE (15), SD (7), DIR (1)<br>TYP (4), CNN (4)<br>DA (16), SA (16)<br>SID (4), LEN (12)<br>CKS (8), ED (7) | 12 |
| 110 | REQUEST--LONG ADDRESS<br>PRE (15), SD (7), DIR (1)<br>TYP (4), CNN (4)<br>DA (64), SA (64)<br>SID (4), LEN (12)<br>CKS (8), ED (7) | 24 |
| 112 | ACK<br>PRE (15), SD (7), DIR (1)<br>TYP (4), CNN (4)<br>SA (16)<br>CKS (8), ED (7) | 8 |
| 114 | NACK<br>PRE (15), SD (7), DIR (1)<br>TYP (4), CNN (4)<br>SA (16)<br>CKS (8), ED (7) | 8 |

DESCRIPTION OF THE ACCESS PROTOCOL (Unless described below, the protocol functions are identical to those in the referenced copending application.)

Slow POLLing Function

As previously described, once a Station is registered, it is periodically POLLed and the infrastructure knows how to reach it. This slow POLL message is the means used to be sure that each Station is present, active, assigned a short address and associated with the correct Access-point in the directory maintained by the system in the Hub Controller. The POLL is the means of detecting Stations that have left the system without DE-REGISTERing. The POLL is used to detect changes in serving Access-point.

The slow POLL is also used to transfer Stations in and out of sleep mode. The Access-point frame for the slow POLL includes a WUT field to instruct the Station to stay awake or to sleep for a specified interval.

The Station response to a slow POLL may either:
1) acknowledge an immediate wakeup, or
2) inform the Hub Controller that it is immediately becoming awake, or
3) accept the proposed wakeup time, or
4) propose a change to the wakeup time.

The transmission originates on the Access-point last used by that Station, otherwise one of the surrounding Access-points is used for a second try. The slow POLL messages are interspersed with other Access-point transmissions on a background level priority.

When the addressed Station responds to the slow POLL, it notes the identification (API) of the Access-point from which the POLL was received as current. If there is a change of Access-point, then the Hub Controller will repeat the POLL on the newly selected Access-point to inform the Station of the change.

The slow POLL also informs the Station that the infrastructure knows it is there. If a Station is not POLLed for some configurable period of time, the Station will then re-REGISTER.

POLLing Timing Parameters

One slow POLL requires: 20 $\mu$sec (9 oct+8 octs+8 $\mu$sec) of air-time at 12 Mbits/sec. For 128 Stations, the POLLing function uses 2.56 milliseconds of air time for a round that might be initiated at intervals of 256 milliseconds to use 1% of available air time. For ease of description, a polling period of 500 milliseconds will be used.

This dimension is quite important to the overall operation of the system. It is the worst case interval before the infrastructure can cause the Station to wakeup if there is a message for that Station.

Radio Signal Level Indication

Only the Access-points have the capacity to measure received signal level, and this facility is used as a means of determining the best Access-point for each Station. If the POLL response of a Station is at a higher level on a different Access-point than on the currently identified Access-point, the status entry for that Station will be changed in a system directory accordingly.

STATION-ORIGINATED MESSAGE-NO REQUEST CONTENTION (This procedure is unchanged from that in the co-pending application, and is repeated in abridged form for convenience.)

In this system, Stations may request use of the channel only when enabled by receipt of an open or an ADDRESSED INVITATION-TO-REQUEST message from the Hub Controller. After a proper REQUEST, the Hub Controller transmits GRANT, and then the Station sends the PACKET DATA FRAME. The Hub Controller will send INVITATION-TO-REQUEST messages only if the conditions necessary for immediate and successful transmission are present. It is possible for the Hub Controller to respond with an ACK message meaning that the REQUEST is received and queued but not granted. The Station must then wait for a GRANT at a later time normally not more than one scan time into the future (a few milliseconds at most). Many Access-points are connected to the common Hub Controller.

Quiescent Condition and Response Recognition Time

The rate at which invitation messages may be processed is slower than previously described in the co-pending application when contention is considered. After the Access-point sends an OPEN INVITATION-TO-REQUEST message, it is necessary for the cycle to wait for the full length of a REQUEST message though detection of absence of signal might require only a few octets of time. It is possible for two contending INVITATION-TO-REQUEST messages to be present without a correct decode. These transmissions must clear the channel before further use can be made.

For the present description, INVITATION messages are transmitted within a constant stepping time for sequential use of Access-points within a scan group. Variations may be later introduced to adapt the stepping interval to traffic demand.

Detail of Normal Station-Originated Message Transfer

All Stations monitor the channel continuously and are able to hear INVITATION-TO-REQUEST messages usually from more than one Access-point. A Station may send a REQUEST immediately following receiving an INVITATION-TO-REQUEST message from the current Access-point as indicated in the last POLL received.

If the INVITATION messages from that Access-point are not heard within a specified interval (e.g. 6 milliseconds), as might be the case for a moving Station, the Station with a message waiting could use any Access-point with matching system identification (SYS).

The Station will receive a response that is either GRANT, ACK or NACK or nothing at all. If it is desirable to have a wait interval during which the Station may receive a GRANT, the infrastructure would reply with immediate ACK. The wait state would be appropriate for delays of up to two or three scan intervals so that the Access-point could GRANT on a following round or from a different Access-point.

If the response is NACK, the REQUEST would be repeated immediately. If there is no reply to the Station REQUEST, the REQUEST would be repeated after the next usable INVITATION-TO-REQUEST. It is possible for a REQUEST to be rejected because the infrastructure does not have the resources to process the message at the time of the REQUEST.

The GRANT message contains the short address of the requesting Station and may contain a power level setting. The addressed Station sends the PACKET DATA FRAME using the previously assigned power level.

After the Packet data frame is sent, the originating Station waits for ACK from the Access-point ending the cycle. If no ACK is received, the Station may repeat the cycle unless the message is part of a connection-type service. For virtual circuits, there is no ACK function since a delayed packet is a lost packet. Non-receipt is unlikely, because the preceding REQUEST was received successfully and because the transmission will be processed at the Hub Controller if it is received on any Access-point.

STATION-ORIGINATED REQUEST WITH CONTENTION

After an OPEN INVITATION-TO-REQUEST, it is possible that two or more Stations will REQUEST at the same time contending for the next channel use allotment. While it is also possible that one or the other will be correctly received, it is necessary to have a method of dealing with unresolved contention.

The method of this invention is to have the first INVITATION open where any Station registered at that Access-point may respond. The evidence of contention is at the Hub Controller where there is failure to decode a REQUEST message in the following time interval, and at the same time there is analog or logical evidence of signal present at a particular port just used for the INVITATION. This combination is defined as probable contention causing further ADDRESSED INVITATIONs to begin.

Most POLLs are a roll call of the possible respondents without any order relative to probable activity. The art of this POLL is to limit the POLL to the Stations that are "awake" and not in sleep mode. This keeps the POLL list short and composed only of potentially active Stations. One part of the art is minimizing the length of the POLLing list, and the other is achieving a high degree of control of the sleep mode as a criteria for presence/absence on the POLL list.

When there is a REQUEST response after an ADDRESSED INVITATION, the procedure is the same as for non-contending sequences. Access protocol provides the necessary degree of cooperation between Station and Hub Controller.

Improved Analog Evidence of Signal Present

At the access-point receiver, there is continuing output of an analog signal level proportional to the aggregate level of the received signals. In a large system with many simultaneously operating transmitters, this indication will commonly be non-zero as a result of weak signals from a great distance. The absolute presence of signal indication at the time when a REQUEST message is expected is an inconclusive indication since it might come from a background interference level.

The method of this invention samples the receive level twice: 1) at the instant of the end of the INVITATION-TO-REQUEST message, and 2) one propagation time later (about 2–6 μseconds for a 12 Mb/s medium). If the second sample exceeds the amplitude of the stored value of the first sample by a sufficient margin (3–6 dB) then it may be concluded that the increase was due to a responding request. The current level and the background signal level are looked at differentially. This is a much more positive indication of response without successful decoding than would be any measurement made and averaged throughout the window period of 24 octets or 16 μseconds without considering possible background indication.

Contending REQUEST Timing Parameters

The POLL of possible Stations is performed using an ADDRESSED INVITATION-TO-REQUEST. Since only one Station can respond, the listening interval need only be long enough to determine that there is no answer unless there is a REQUEST. As an illustration, the listening interval after a REQUEST may be only 6 octets plus a two propagation times before the next ADDRESSED INVITATION. For comparison, the listen interval for an OPEN INVITATION must be a maximum long address REQUEST length of 24 octets plus the two propagation times. This point reduces the time used per Station to run the POLL to the first point of answer.

It is expected that with reasonable proportions, 8 ADDRESSED INVITATIONs could be completed within the interval of time allotted to one Access-point in a sequential group still leaving time enough for considerable useful data transfer. Because of selection process for POLLed addresses, it is unlikely that more than four addresses will be POLLed.

Sequence and Listing of Addresses for ADDRESSED INVITATIONs

To be on the POLL address list, the Station must have the following qualifications:

1) the Station is registered and assigned to the current Access-point; and 2) the Station is in the "awake" state as determined by the last slow POLL.

It is possible for contention to be indicated even when no Stations are active. One possibility is that the signal present indication is spurious. In this case it is important that the active list be short so that a minimum of channel time is lost.

It will also be commonplace that Stations become inactive and will need to send a message before the next POLL however soon. In this case the Stations can respond to an INVITATION-TO-REQUEST message even when inactive, and therefore a small possibility of contention arises. These Stations will be inactive status when they appear. It may prove desirable to lengthen the address list to include Stations which have been active within the last few seconds or even minutes. This is particularly relevant when the active list is empty or nearly empty.

A possible sequence for listing Stations is to assume that those that have used the medium the most in the last few seconds or since the last slow POLL are those most likely to be transmitting. The concept is that the system should clear waiting traffic as quickly as possible. It is also possible that a fairness criteria might favor the Station that has had the longest time since last use. The order in which eligible Stations are listed may not be critical if only a few Stations are awake at any one time. The choice between these and other possible sequence algorithms may be configurable in the Hub Controller where the choice is implemented.

INTEGRATING THE SLEEP MODE IN THE STATION

Refinement of power consumption minimization is already well advanced in portable computing equipment, and now must be extended to the radio and communication logic. The drain of radio receiving and data stream decoding circuits is presumed too high to be allowed continuously. Typically, a LAN communication port is active for transmitting or receiving messages much less than 1% of the time. Using logic levels obtained from the computer, the receiving function will only be powered in anticipation of need.

As a default assumption, it is expected that the awake mode will be initiated by activity in the central processor, and terminated by absence of activity for two consecutive POLLs. When awake the communication adaption portion of the computer is quiescently transmitter OFF but fully able to send upon demand after executing the access protocol, and to receive at any time to process received protocol messages.

In operation, the communication function would be active for intervals of about a second, and in sleep for much longer irregular intervals. With refinement, the awake intervals would be much shorter and more frequent.

It is possible that the criteria for active state in the communication adapter may have a narrower criteria than any computation activity. Subsets may appear based on the association of certain operating system commands with the use of external communication. For example, any use of a file access associated command might be a precursor to external communication which would be unconcerned with a large part of document composition work.

EXAMPLE OF NUMERICAL PARAMETERS

The operation of this protocol aspect may be better understood from a numerical example within the range of the invention. Assume that the parameters below in Table III are given for a particular implementation:

TABLE III

| SYSTEM PARAMETERS | |
|---|---|
| Physical medium signaling rate: | 12 Mb/s |
| Scan group size or reuse value: | 4 |
| Scan time for one group: | 1800 μsec |
| Average available time for one Access-point: | 450 μsec |
| POLL repetition rate: | 4500 μsec |
| Wakeup timeout delay: | <2 POLL intervals |
| No. Stations per Access-point: | 16 avg., 32 max. |

TABLE III-continued

SYSTEM PARAMETERS

One-way delay and propagation time: 4 μsec

Figures 1, 1B:
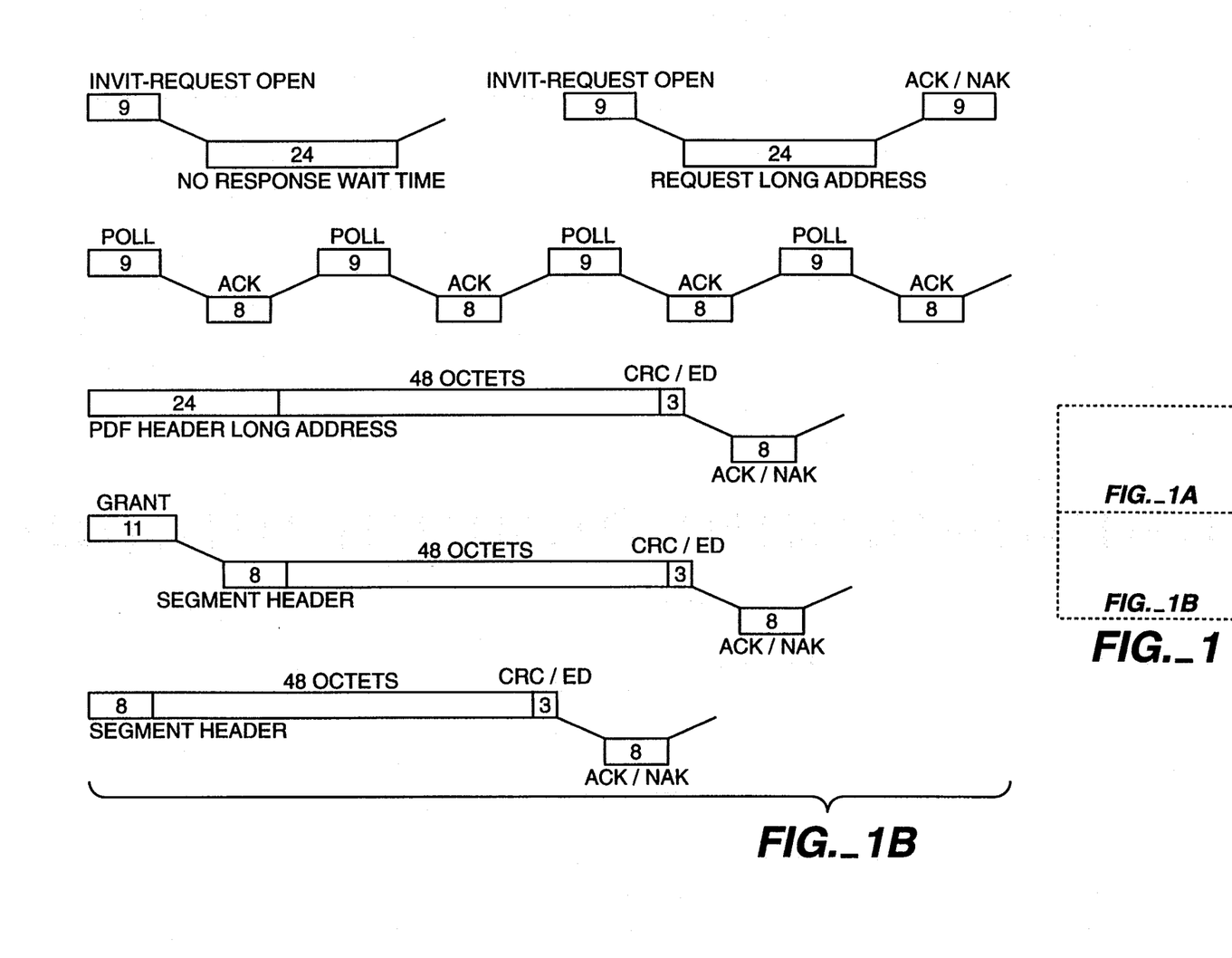
FIG. 1 is a key to the reconstruction of FIGS. 1A and 1B which show in approximate scale, the formats for most of the common message-based transactions. The assumed 4 microseconds propagation and delay time may be larger than actually used.
Figure 1A:
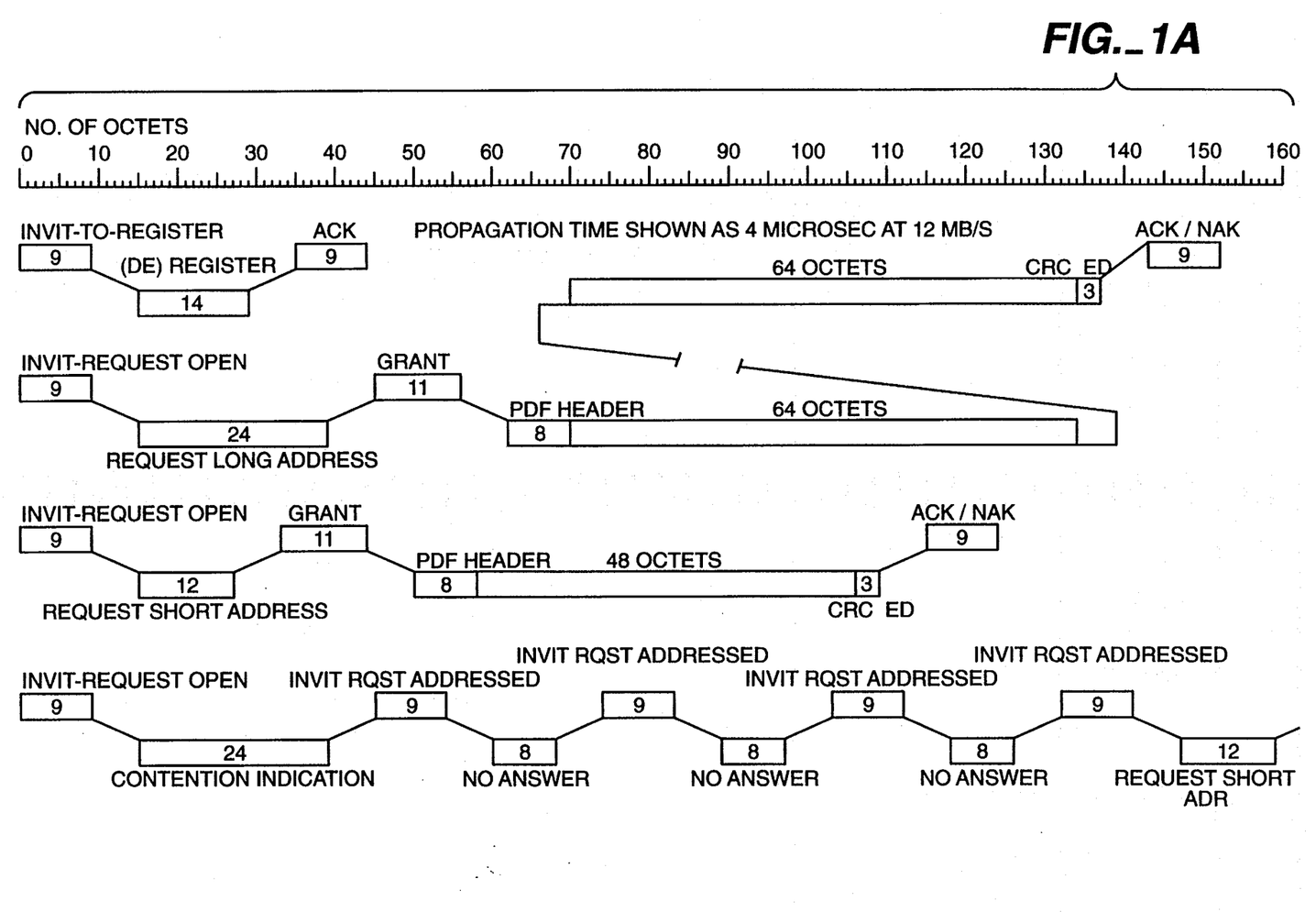
Figure 2:
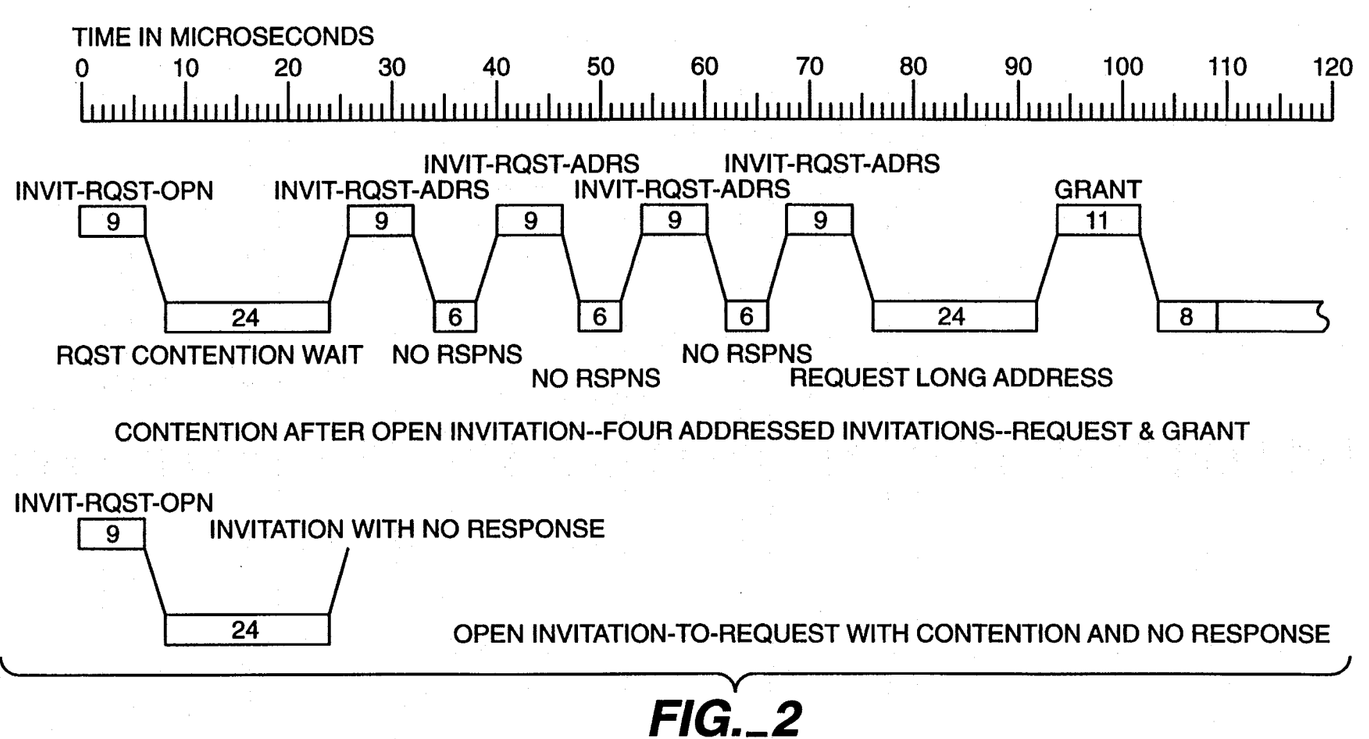
FIG. 2 is a further diagram showing the timing relationship for contention and no answer response to the open INVITATION-TO-REQUEST. Four addressed invitations before a response is shown. This figure also shows that the wait time for no answer may be much shorter for the addressed case. In this diagram propagation time is 2 $\mu$seconds.

Further assume that the set of message functions is as given in Table I and the channel time required for a number of routine operations with the makeup shown in FIG. 2 is as given below in Table IV:

TABLE IV

TRANSACTION LENGTH

|  | μsec |
|---|---|
| OPEN INVITATION-TO-REQUEST with long address REQUEST: | +52 |
| Same with 48 octet message: | 76 |
| Same with 512 octet message: | 394 |
| OPEN INVITATION-TO-REQUEST with short address REQUEST: | +47 |
| Same with 48 octet message: | 95 |
| Same with 512 octet message: | 389 |
| OPEN INVITATION-TO-REQUEST with contention and following ADDRESSED INVITATIONs until short address REQUEST is received adds time to normal transfer as follows-- | |
| with one ADDRESSED INVITATION: | +30 |
| with 4 ADDRESSED INVITATIONS, short address REQUEST: | +90 |
| POLL duration for one addressed POLL: | 20 |
| Access-point originate message with long address: | +36 |
| Access-point originate message with short address: | +24 |
| Same with 48 octet message: | 56 |
| Same with 512 octet message: | 366 |
| Auto GRANT Station-originate segment with 512 octets: | 372 |
| Access-point originate segment with 512 octets: | 363 |

With these proportions, each Access-point may hold the channel for 450 μseconds. It also possible that unused portions of this interval allotted to the three previous Access-points in the group of four could be used by the current Access-point.

In the interval allotted to one Access-point, any combination of these messages may be serially transmitted. The sequence would give priority in the following order highest priority first:

1) Station originated connection type segments for 64 Kb/s virtual circuits by auto GRANT.
2) Access-point originated connection type segments for 64 Kb/s virtual circuits.
3) Access-point originated connection type segments for N*B virtual circuits.
4) Station originated connection type segments for N*B virtual circuits.
5) OPEN INVITATION-TO-REQUEST with delayed GRANT.
6) OPEN INVITATION-TO-REQUEST normal.
7) Access-point originated priority packets.
8) Station originated priority packets.
9) Access-point originated routine packets.
10) Station originated routine packets.
11) POLL.
12) INVITATION-TO-REGISTER.

An important subtlety is that it is necessary to record and queue REQUESTs for service even when service cannot be provided. If this is not done, the number of Stations requesting and re-requesting service can compound under high load increasing the probability of contention to unmanageable proportions.

Figure 3:
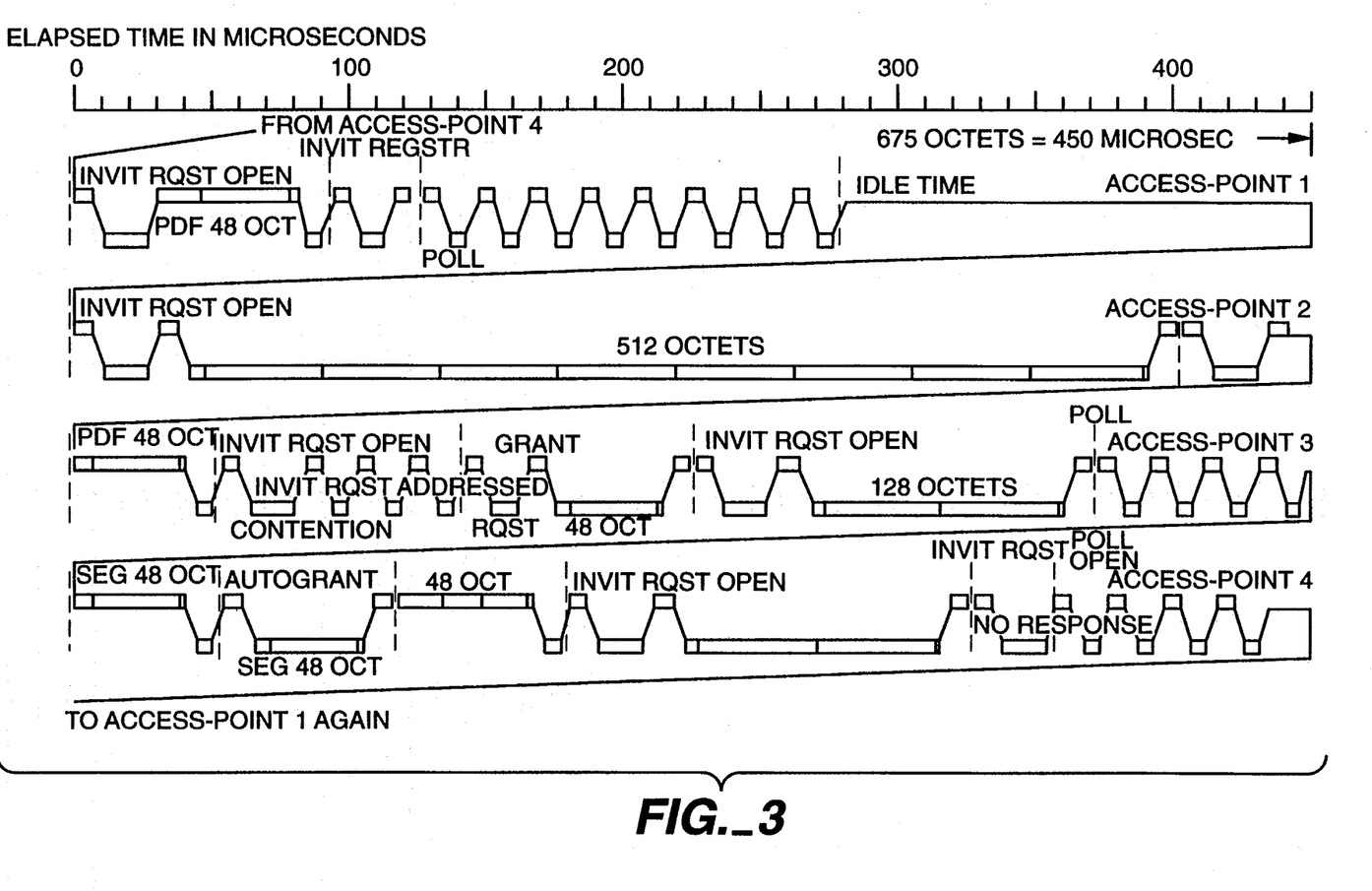
FIG. 3 diagrams four sequentially-used Access-points with a different scenario for each of the four Access-points portrayed. Each horizontal sequence is the activity of one Access-point. The time duration for the entire diagram is 1.8 milliseconds. The vertical dashed lines are the boundaries between messages sequences.

FIG. 3 is an illustration showing example traffic using the proportions given above. Each of four Access-points is allotted (for this example) equal time intervals during which a variety of inward and outward services are performed. The time interval covered by the diagram is 4*450 μseconds. To see the action of POLLing, segmentation, sleep/wake transition and delayed GRANT, it would be necessary for the diagram to cover many scans over a greater period of time.

While this invention has been described in connection with preferred embodiments thereof, it is obvious that modifications and changes therein may be made by those skilled in the art to which it pertains without departing from the spirit and sope of the invention. For example, the term "wireless" as used in this specification applies equally to radio and optical propagation.

Accordingly, the scope of this invention is to be limited only by the appended claims.

What is claimed as invention is:

1. A method for sleep mode control for a wireless data communication network that serves battery-powered portable stations having an active mode with full functional capability and a quiescent mode where function is minimized for the purpose of reducing quiescent power drain, and where said stations automatically switch between these modes in response to user needs, and where said data communication network uses a system with a plurality of wireless access-points controlled from a common processor, and having an access method based upon exchange of data messages to manage channel access, said messages including registration, polling and invitation-to-request-service messages, said method for sleep mode control comprising the steps of:

polling each station with periodic asynchronously-timed addressed messages to assign either an active state to be maintained until after the next periodic message is received, thereby enabling an addressed station to receive data transfer messages transmitted from the system, or to assign permission to be inactive for a period of time specified in that message and after which a further periodic message will be received to renew the instruction, thereby reducing power supply to the circuit functions in said addressed station until the indicated inactive time has expired;

transmitting a poll acknowledgement message from said addressed station to the system to confirm the active or inactive status to the system of that addressed station until the next poll; and transmitting a poll acknowledgement message from said addressed station to the system to advise the system whenever that addressed station will become active for the purpose of initiating data transfer messages to the system.

2. The method of claim 1 further including the step of:

allowing station transition to the active state at any time by response to any invitation-to-request message, and permitting a station once becoming active to remain active until at least the next polling message from the system.

3. The method of claim 1 further including the step of:

providing said stations with communication adapter functions which include a fully functional active state and a minimum power drain quiescent state, which is switched to active state dependent upon a selective indication of impending need for communication depending upon the existence of certain commands or memory access functions on a bus, which are a subset of all commands that may appear on the bus.

4. A method for contention resolution for a wireless data communication network that serves battery-powered portable stations having an active mode with full functional capability and a quiescent mode where function is minimized for the purpose of reducing quiescent power drain, and where said stations automatically switch between these modes in response to user needs, and where said data communication network uses a system with a plurality of wireless access-points controlled from a common processor, and having an access method based upon exchange of data messages to manage channel access, said messages including registration, polling and invitation-to-request-service messages, said method for contention resolution comprising the steps of:

delaying system response following transmission of an invitation message for an interval of time equal to the longest possible request message and propagation delay;

initiating through an access-point one or more addressed invitation-to-request messages successively to those stations which are in active status and associated with that access-point, and excluding stations which are inactive or not associated with that access-point, whenever two or more stations respond simultaneously to an invitation to request service from the system, and where contention is indicated by the receipt of partially valid messages containing errors or by the presence of signal and absence of a correctly decoded message at the system; and controlling the system to classify as invalid anything other than receipt of a valid data transmission containing a correctly marked message type, where after each addressed invitation-to-request message the system determines there is not a valid request message being received in the shortest possible time before sending a next addressed invitation-to-request message.

5. The method of claim 4 further including the step of:

controlling the system so that if few or no stations are active, currently inactive stations which were previously active are addressed with invitation-to-request messages in sequence or priority lower than that of currently active stations.

6. The method of claim 4 further including the step of:

controlling the system so that station contention is indicated by presence of a signal level which is detectably greater after the expected start time of the request message than it was immediately before the expected start time of the request message, and concurrently an absence of decode of a valid request message, and where absence of that difference in signal level is used to define the shortest possible wait for determining absence of response after an addressed invitation.

7. A method for sleep mode and contention resolution for a wireless data communication network that serves battery-powered portable stations having an active mode with full functional capability and a quiescent mode where function is minimized for the purpose of reducing quiescent power drain, and where said stations automatically switch between these modes in response to user needs, and where said data communication network uses a system with a plurality of wireless access-points controlled from a common processor, and having an access method based upon exchange of data messages to manage channel access, said messages including registration, polling and invitation-to-request-service messages, said method for sleep mode and contention resolution comprising the steps of:

polling each station with periodic asynchronously-timed addressed messages to assign either an active state to be maintained until after the next periodic message is received, thereby enabling an addressed station to receive data transfer messages transmitted from the system, or to assign permission to be inactive for a period of time specified in that message and after which a further periodic message will be received to renew the instruction, thereby reducing power supply to the circuit functions in said addressed station until the indicated inactive time has expired;

transmitting a poll acknowledgement message from said addressed station to the system to confirm the active or inactive status to the system of that addressed station until the next poll;

transmitting a poll acknowledgement message from said addressed station to the system to advise the system whenever that addressed station will become active for the purpose of initiating data transfer messages to the system;

controlling the system following transmission of an invitation-to-request message to wait an interval of time equal to the longest possible request message and propagation delay;

initiating through an access-point one or more addressed invitation-to-request messages successively to those stations which are in active status and associated with that access-point, and excluding stations which are inactive or not associated with that access-point, whenever two or more stations respond simultaneously to an invitation to request service from the system, and where contention is indicated by the receipt of partially valid messages containing errors or by the presence of signal and absence of a correctly decoded message at the system; and controlling the system to classify as invalid anything other than receipt of a valid data transmission containing a correctly marked message type, where after each addressed invitation-to-request message the system determines there is not a valid request message being received in the shortest possible time before sending a next addressed invitation-to-request message.

8. The method of claim 7 further including the step of:

controlling the system so that if few or no stations are active, currently inactive stations which were active within the last several polls are addressed with invitation messages in sequence or priority lower than that of currently active stations.

9. The method of claim 7 further including the step of:

providing said stations with communication adapter functions which include a fully functional active state and a minimum power drain quiescent state, which is switched to active state dependent upon a selective indication of impending need for communication depending upon the existence of certain commands or memory access functions on a bus, which are a subset of all commands that may appear on the bus.

10. The method of claim 7 further including the step of:

controlling the system so that station contention is indicated by presence of a signal level which is detectably greater after the expected start time of the request message than it was immediately before the expected start time of the message request, and concurrently an absence of decode of a valid request message, and where absence of that difference in signal level is used to define the shortest possible wait for determining absence of response after an addressed invitation.

* * * * *